United States Patent
Vinje et al.

(10) Patent No.: US 11,598,894 B2
(45) Date of Patent: Mar. 7, 2023

(54) METHOD AND SYSTEM FOR SEISMIC DATA ACQUISITION WITH TOP AND FRONT SOURCES

(71) Applicant: SERCEL, Carquefou (FR)

(72) Inventors: Vetle Vinje, Oslo (NO); Anne Camerer, Oslo (NO); Iain Burnie, Houston, TX (US)

(73) Assignee: SERCEL, Carquefou (FR)

( * ) Notice: Subject to any disclaimer, the term of this patent is extended or adjusted under 35 U.S.C. 154(b) by 175 days.

(21) Appl. No.: 16/854,214

(22) Filed: Apr. 21, 2020

(65) Prior Publication Data

US 2021/0325556 A1    Oct. 21, 2021

(51) Int. Cl.
*G01V 1/38* (2006.01)

(52) U.S. Cl.
CPC .......... *G01V 1/3817* (2013.01); *G01V 1/3808* (2013.01); *G01V 1/3843* (2013.01)

(58) Field of Classification Search
CPC .. G01V 1/3817; G01V 1/3843; G01V 1/3808; G01V 1/3861; G01V 1/006
See application file for complete search history.

(56) References Cited

U.S. PATENT DOCUMENTS

| | | | |
|---|---|---|---|
| 5,668,775 A | 9/1997 | Hatteland | |
| 5,761,152 A | 6/1998 | Jacobsen et al. | |
| 7,330,401 B2 * | 2/2008 | Jeffryes | G01V 1/005 367/41 |
| 8,531,912 B2 | 9/2013 | Soubaras | |
| 8,593,904 B2 | 11/2013 | Soubaras | |
| 8,792,296 B2 | 7/2014 | Soubaras | |
| 9,134,446 B2 | 9/2015 | Soubaras | |
| 9,348,051 B2 | 5/2016 | Rohnke et al. | |
| 9,551,800 B2 | 1/2017 | Rohnke et al. | |
| 9,651,697 B2 | 5/2017 | Wang et al. | |
| 10,274,622 B2 | 4/2019 | Mensch et al. | |
| 10,317,552 B2 * | 6/2019 | Dellinger | G01V 1/345 |

(Continued)

FOREIGN PATENT DOCUMENTS

| EP | 3118655 A1 | 1/2017 |
|---|---|---|
| WO | 0225315 A2 | 3/2002 |

(Continued)

OTHER PUBLICATIONS

Vinje, et al, "Shooting over the seismic spread", 79th EAGE Conference and Exhibition, Paris, France, Jun. 12-15, 2017 (Year: 2017).*

(Continued)

*Primary Examiner* — Ian J Lobo
(74) *Attorney, Agent, or Firm* — Patent Portfolio Builders PLLC

(57) ABSTRACT

A marine seismic data acquisition system includes a streamer spread including plural streamers; a first set of front sources configured to generate seismic waves; a streamer vessel towing the streamer spread and the first set of the front sources, in front of the streamer spread along an inline direction X; a second set of top sources configured to generate additional seismic waves; and first and second source vessels towing the second set of top sources directly above or below the streamer spread. A number NT of the top sources is larger than a number NF of the front sources.

19 Claims, 10 Drawing Sheets

(56) References Cited

U.S. PATENT DOCUMENTS

| | | | |
|---|---|---|---|
| 2011/0044127 A1 | 2/2011 | Kostov et al. | |
| 2013/0170316 A1 | 7/2013 | Mandroux | |
| 2014/0050047 A1 | 2/2014 | Soubaras | |
| 2014/0362662 A1* | 12/2014 | Mandroux | G01V 1/02 367/20 |
| 2015/0241587 A1 | 8/2015 | Baardman | |
| 2016/0245944 A1 | 8/2016 | Mandroux et al. | |
| 2017/0017005 A1 | 1/2017 | Siliqi et al. | |
| 2017/0363760 A1 | 12/2017 | Mensch et al. | |
| 2018/0164450 A1 | 6/2018 | Long | |
| 2018/0321406 A1 | 11/2018 | Strand et al. | |
| 2018/0364384 A1 | 12/2018 | Beitz et al. | |
| 2019/0277992 A1 | 9/2019 | Siliqi et al. | |
| 2020/0012004 A1* | 1/2020 | Elboth | G01V 1/3835 |

FOREIGN PATENT DOCUMENTS

| | | | | |
|---|---|---|---|---|
| WO | WO-0225315 A2 * | 3/2002 | | G01V 1/3808 |
| WO | 2016054008 A1 | 4/2016 | | |
| WO | 2017121735 A1 | 7/2017 | | |
| WO | WO-2017121735 A1 * | 7/2017 | | G01V 1/3808 |
| WO | 2019043452 A1 | 3/2019 | | |

OTHER PUBLICATIONS

International Search Report in corresponding/related International Application No. PCT/IB2019/000781 dated Dec. 12, 2019.
J. Rohnke et al., "Simultaneous Source Separation Using an Annihilation Filter Approach", 78th EAGE Conference and Exhibition, May 30-Juen 2, 2016, Vienna, Austria.
Margherita Maraschini et al., "Rank-reduction deblending for record length extension: The example of the Carnarvon basin", SEG International Exposition and 86th Annual Meeting, Oct. 16-21, 2016, Dallas, Texas, pp. 4628-4632.
V. Vinje et al., "Hunting High and Low in Marine Seismic Acquisition: Combining Wide-tow Top Sources With Fron Sources", 81st EAGE Conference & Exhibition, Jun. 3-6, 2019, London, UK.
Written Opinion in corresponding/related International Application No. PCT/IB2019/000781 dated Dec. 12, 2019.
Zhigang Zhang et al., "Seismic interference noise attenuation based on sparse inversion", SEG New Orleans Annual Meeting, Oct. 18-23, 2015, New Orleans, Louisiana, pp. 4662-4666.
International Search Report / Written Opinion dated Jul. 15, 2021 in related/corresponding PCT Application No. PCT/IB2021/000285.
U.S. Office Action in related U.S. Appl. No. 16/028,703 dated Oct. 22, 2020.
U.S. Office Action in related/corresponding U.S. Appl. No. 16/028,703 dated Jul. 28, 2021.
Office Action in related/corresponding European Application No. 19 773 490.8 dated Sep. 22, 2022.

* cited by examiner

METHOD AND SYSTEM FOR SEISMIC DATA ACQUISITION WITH TOP AND FRONT SOURCES

TECHNICAL FIELD

Embodiments of the subject matter disclosed herein generally relate to methods and systems for marine seismic data acquisition with multiple sources and, more particularly, to mechanisms and techniques for acquiring seismic data with top and front sources.

BACKGROUND

In oil and gas exploration and exploitation, marine seismic surveys are used for making drilling-related decisions. Seismic data acquired during such a survey is processed to generate a profile, which is a three-dimensional approximation of the geophysical structure under the seafloor. This profile enables those trained in the field to evaluate the presence or absence of oil and/or gas reservoirs, which leads to better management of reservoir exploitation. Enhancing seismic data acquisition and processing is an ongoing process.

FIG. 1 is a vertical-plane view of a generic marine survey setup 100. A vessel 101 tows a seismic source 102 (note that, for simplicity, the source's full configuration is not shown) and streamers (only one streamer 104 is visible in this view) along a towing direction T. When the seismic source is activated, seismic energy is emitted into the water (as wavefields) and propagates into the rock formation under the seafloor 110. The seismic energy is partially reflected and partially transmitted at interfaces where the acoustic impedance changes, such as at the seafloor 110 and at an interface 112 inside the rock formation. The reflected energy may be detected by sensors or receivers 106 (e.g., hydrophones, geophones and/or accelerometers) carried by the streamers. The seismic data represents the detected energy.

However, the traditional marine seismic survey illustrated in FIG. 1 fails to collect high-quality shallow seismic data because of the positioning of the seismic sources in front of the streamer spread, which means that an angle of a wavefield propagation direction relative to the reflector normal, for a given subsurface reflection point, is large.

Thus, there is a need to provide data acquisition systems and methods that would acquire high-resolution seismic data with small reflection angles for both deep regions and shallow regions of the subsurface.

SUMMARY

Methods and systems acquire high-resolution seismic data faster and cheaper than conventional means by using top and front sources, with the top source being towed above the streamer spread.

According to an embodiment, there is a marine seismic data acquisition system that includes a streamer spread including plural streamers, a first set of front sources configured to generate seismic waves, a streamer vessel towing the streamer spread and the first set of the front sources, in front of the streamer spread along an inline direction X, a second set of top sources configured to generate additional seismic waves, and first and second source vessels towing the second set of top sources directly above or below the streamer spread. A number NT of the top sources is larger than a number NF of the front sources.

According to another embodiment, there is a marine seismic data acquisition system that includes a streamer spread including plural streamers, a first set of front sources configured to generate seismic waves, wherein the first set of the front sources is towed in front of the streamer spread, along an inline direction X, a second set of top sources configured to generate additional seismic waves, wherein the second set of the top sources is directly above or below the streamer spread. A number NT of the top sources is larger than a number NF of the front sources.

According to yet another embodiment, there is a method for configuring a marine seismic acquisition data system. The method includes selecting a number NF of front sources, wherein the front sources are towed in front of a streamer spread, along an inline direction X; selecting a frequency range FF for the front sources; selecting a number NT of top sources, wherein the top sources are towed vertically directly above or below the streamer spread; and selecting a cross-line separation DSTy between adjacent top sources of the top sources that is larger than a cross-line separation DSFy between adjacent front sources of the front sources, wherein a cross-line direction is perpendicular to an inline direction.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
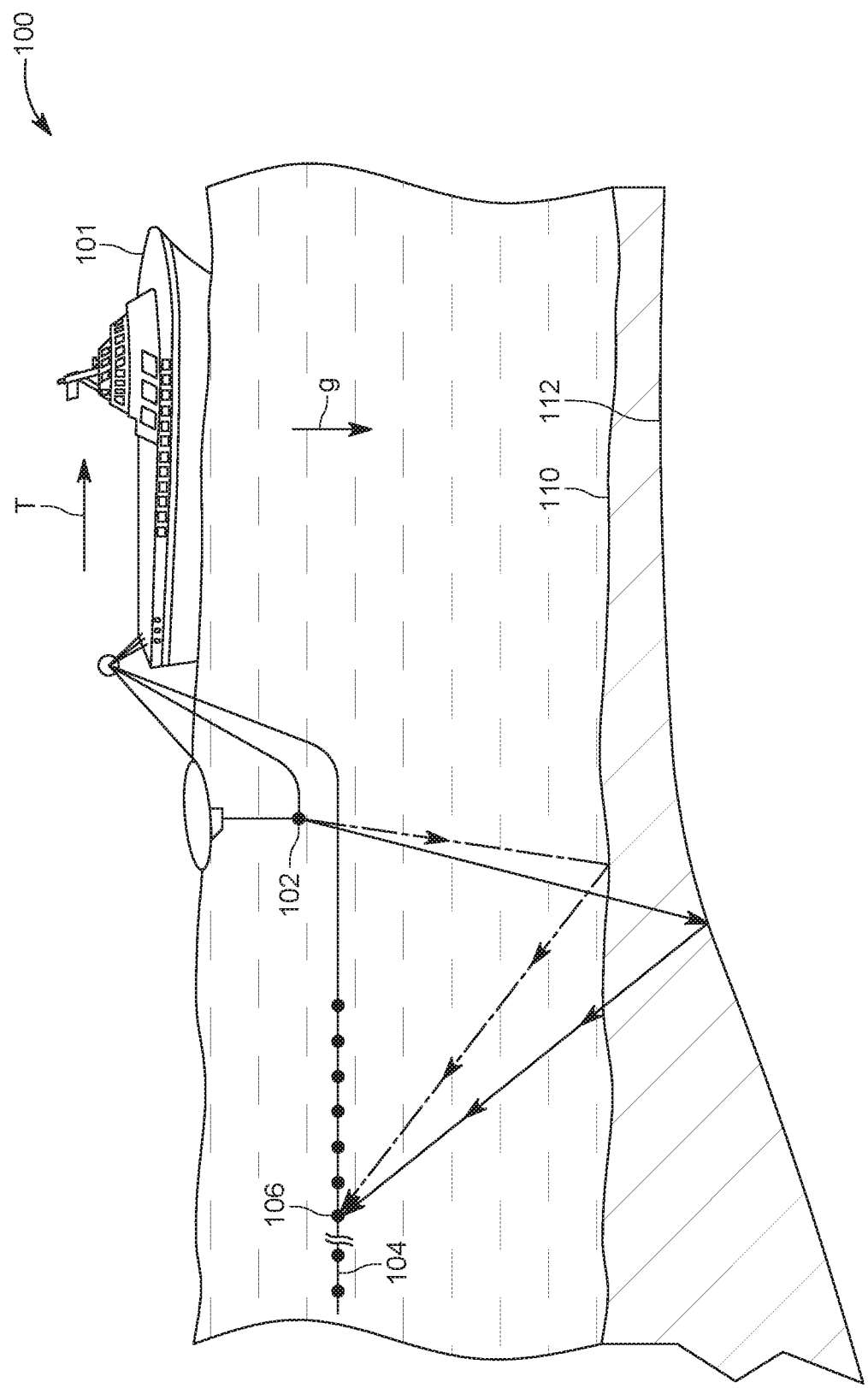
FIG. 1 illustrates a generic marine survey setup having only front sources.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic data acquisition system. However, the current inventive concepts may be used for other types of surveys, such as surveys using electromagnetic waves or land surveys.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described in this section, a marine seismic data acquisition system uses a first set of front sources and a second set of top sources, with the number of top sources being larger than the number of front sources. In one alternative embodiment, a cross-line distance between adjacent top sources is larger than a cross-line distance between adjacent front sources. In one embodiment, the front sources are selected to achieve deep penetration, i.e., to emit mainly low frequencies (for example, 10 Hz or lower) while the top sources are selected to achieve shallow penetration, i.e., to emit mainly high frequencies (for example 10 Hz or higher). Thus, in one embodiment, the frequency spectrum emitted by the top sources is selected to complement the frequency spectrum emitted by the front sources. In one application, the front sources emit in a first frequency spectrum and the top sources emit in a second frequency spectrum, where the first frequency spectrum is different from the second frequency spectrum. In one variation of this embodiment, the first and second frequency spectra of the first and second sets of sources only partially or completely overlap. For example, in one application, the front sources emits frequencies less than 60 Hz while the top sources emit frequencies less than 300 Hz.

Prior to discussing these embodiments in more detail, it is noted that U.S. Pat. No. 10,338,257, which belongs to the Assignee of this application, shows in FIG. 4, which corresponds to FIG. 2 in this application, that two sources 210 and 220 are towed along source lines 215 and 225, respectively, with a same vessel 202, at a cross-line distance equal to an illumination width D, from one another. Source 210 is towed in front of the streamer spread 230 (a streamer spread includes one or more streamers) while source 220 is towed above the streamer spread 230. In this configuration, the sources are positioned at an inline distance D' (the inline direction is the towing direction). For example, distance D' may be about 3 km, the streamers may be towed at depths between 25 m and 50 m, and the seismic source 220 is towed at depths between 5 and 20 m. The streamers may be instrumented with depth controlling devices to be towed while maintaining a depth-varying depth as described, for example, in U.S. Pat. Nos. 9,134,446, 8,531,912, 8,593,904, 8,792,296 and U.S. Patent Application Publication No. 2014/0050047.

Figure 2:
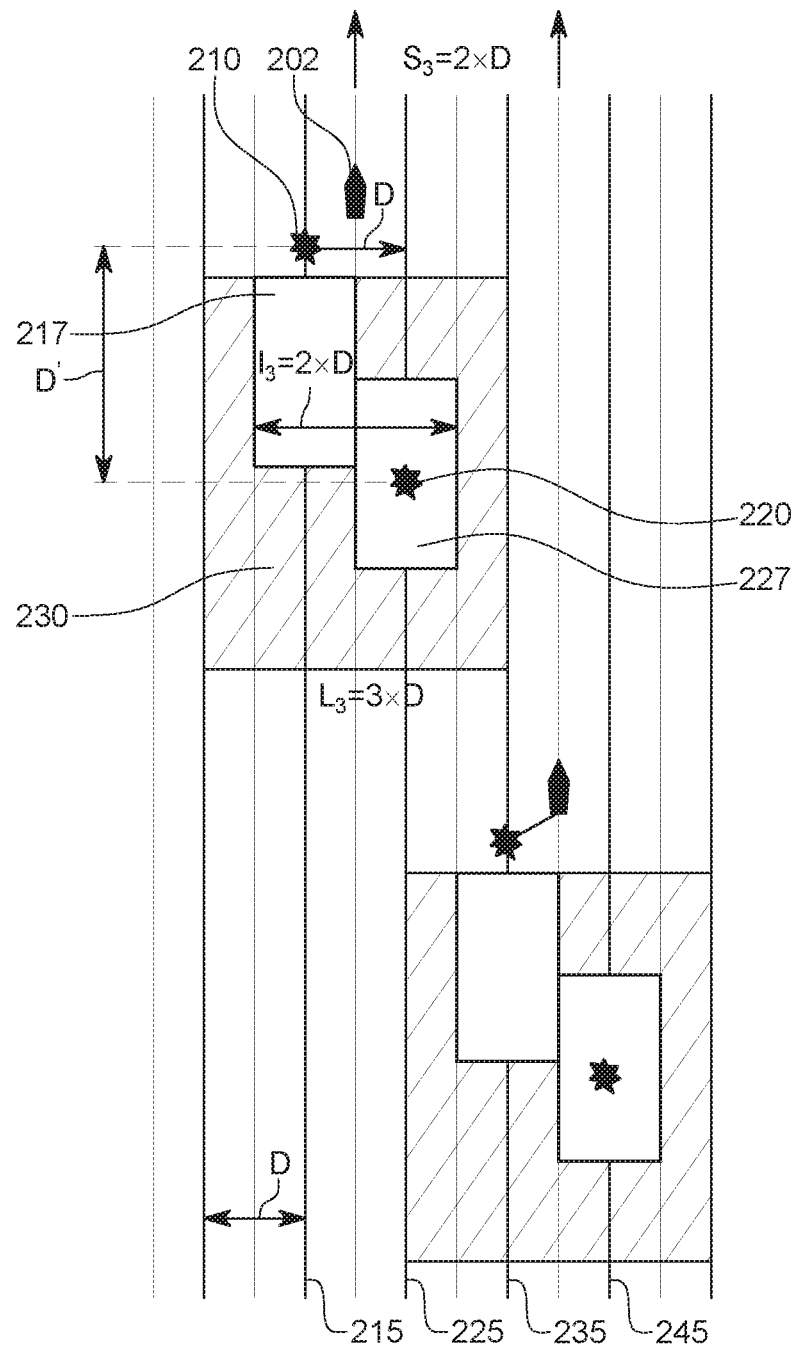
FIG. 2 is a bird's-eye view of a marine survey system that uses one front source and one top source.

In this configuration, sources 210 and 220 illuminate adjacent but inline-shifted rectangular areas 217 and 227, respectively. Note that these areas are not drawn at scale, as they are intended to just illustrate that the two sources would illuminate different areas. The term "inline" relates to the towing direction. The width of the area illuminated by sources 210 and 220 is $I_3=2\times D$. A streamer spread having a cross-line width of at least $L_3=3\times D$ is used to acquire seismic data related to both sources. The distance between adjacent sail lines is $S_3=2\times D$. The bottom half of FIG. 2 illustrates the data acquisition system sailing along a sail line adjacent to the sail line along which the data acquisition represented in the upper half sails. The cross-line distance between adjacent source lines (i.e., 215 to 225, 225 to 235, 235 to 245) related to the same or adjacent sail lines is equal to the illumination width D. Note that the illumination width D is defined by the positions of the two most distal streamers of the streamer spread and the position of the source relative to the most distal streamers, as known in the art, and the illustration of the illumination width D in FIG. 2 should be understood as a cartoon type illustration and not as at scale representation of the various positions and distances.

The inventors of the present invention have found that by strategically placing multiple top sources over the streamer spread and one or more front sources in front of the streamer spread, a higher quality seismic data may be collected than that collected by the system shown in FIG. 2 and thus, a more accurate image of the surveyed subsurface may be generated. Note that a "top source" is defined herein to be any source that is located directly above the streamer spread while a "front source" is defined herein to be any source that is placed in front of the streamer spread, along an inline direction. The inventors adjusted the number of the top and front sources and/or the cross-line distances between them, and/or the frequency spectrum emitted by these sources based on the observations that (1) the front source or sources are mainly used to generate seismic waves which are capable to enter deep into the subsurface (in the order 1 to 20 km) and (2) the top sources are mainly used to generate swallow penetrating seismic waves, (e.g., not more than 4 km). Separating the generation of the shallow and deep seismic waves and the placement at the different positions of the sources that generate the shallow and deep seismic waves was not recognized in the art. Details about the configuration of the top and front sources that achieve such separation are now discussed with regard to the figures.

Figure 3:
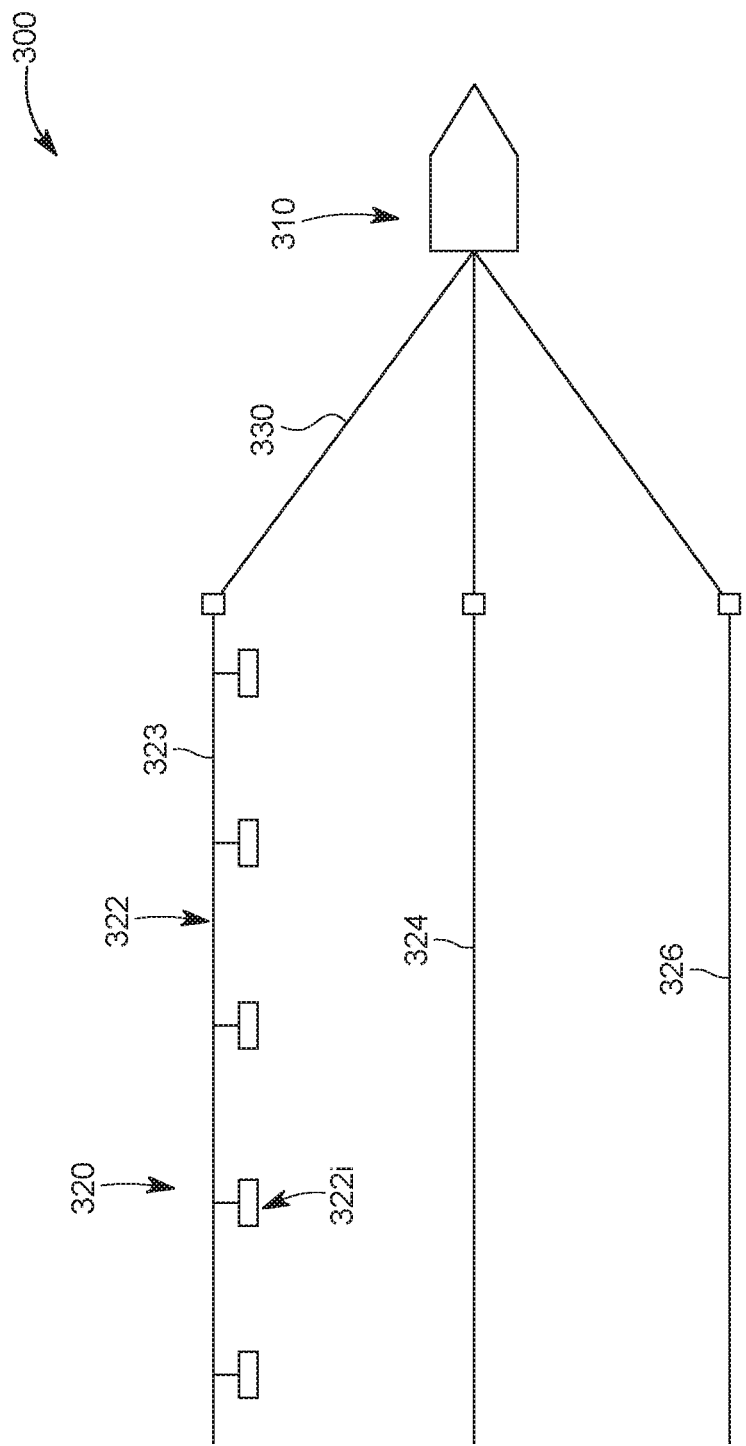
FIG. 3 illustrates the configuration of a source array.

The term "seismic source" is often used in the literature with different meanings. To avoid confusion, this term is illustrated in FIG. 3 and now discussed. FIG. 3 shows a seismic acquisition system 300 that includes a towing vessel 310 towing a source 320. Note that the towing vessel may or may not also tow a streamer spread. The source 320 is actually a seismic source "array" that includes one or more subarrays. The source 320 in FIG. 3 includes three subarrays 322, 324, and 326. More or less sub-arrays may be present. Each subarray includes a float 323 and plural single source elements $322_i$ (only one subarray is shown having these elements for simplicity). The float is designed to float at the water surface and the plural single source elements $322_i$ are suspended from the float and kept by the float at a given depth in the water. A single source element may be an air gun, water gun, a vibratory element, etc. Each subarray may be attached with a corresponding umbilical 330 to the towing vessel 310. If the vessel tows only sources, it is called a source vessel. If the vessel also tows a streamer or a streamer spread, it is called a streamer vessel.

Each single source element is configured to emit a given frequency spectrum. For example, if the single source element is an air gun, the air volume and its pressure influence the frequency spectrum generated by such air gun. Thus, by adjusting the geometry of the air gun and its air pressure, the frequency spectrum of the gun can be controlled.

Figure 4:
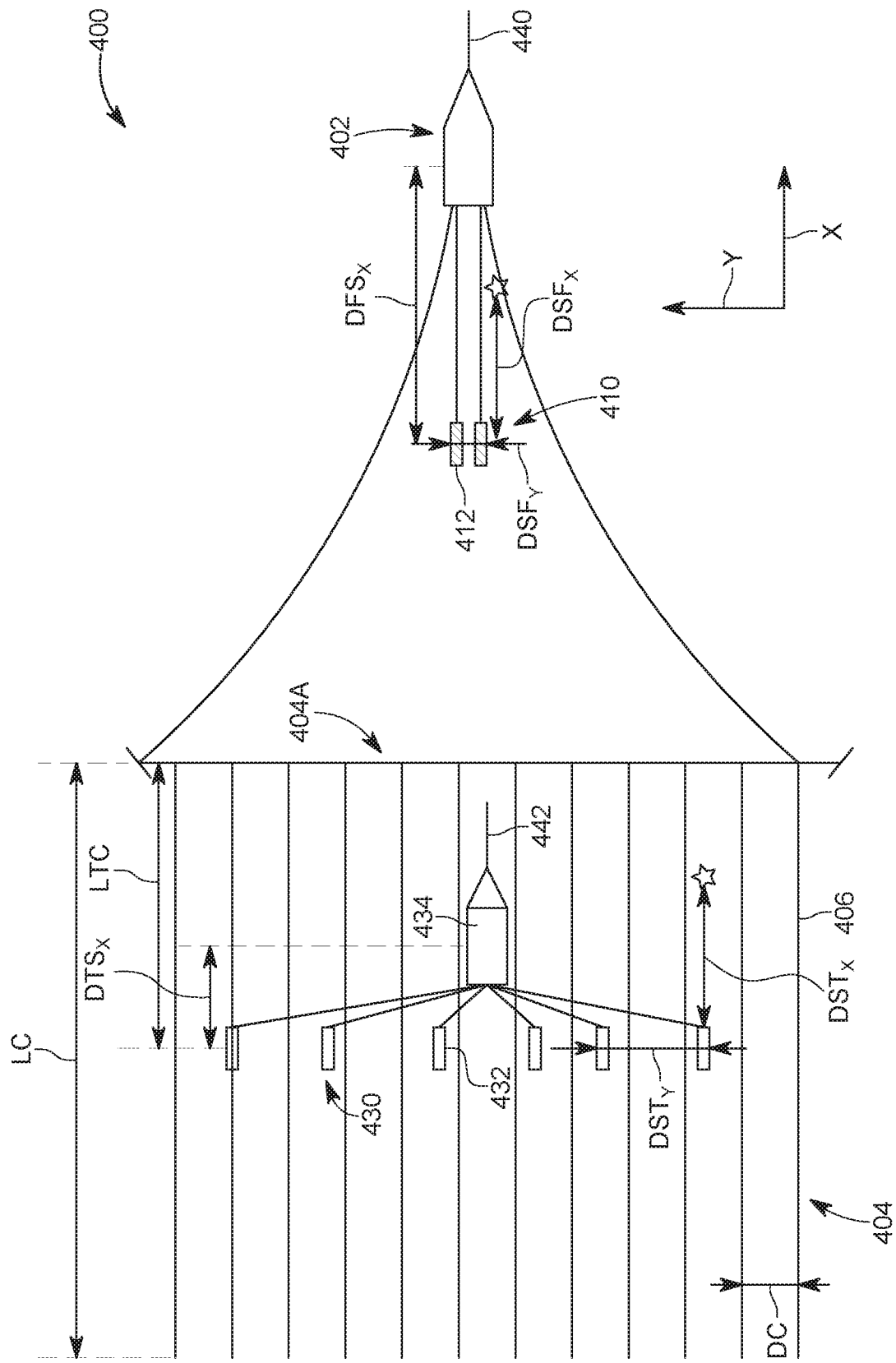
FIG. 4 illustrates a marine seismic data acquisition system that includes front sources and top sources.

With this clarification for the term "seismic source," FIG. 4 illustrates a first embodiment in which a marine seismic data acquisition system 400 includes a towing vessel 402 (called herein a streamer vessel), a streamer spread 404 towed by the streamer vessel 402, and including N streamers 406, a first set 410 of front sources 412 that are placed in front of the streamer spread 404, along the inline direction X, and a second set 430 of top sources 432, which are placed over (i.e., on top) of the streamer spread 404. The top sources 432 are towed in this embodiment by a source vessel 434. A source vessel is a vessel that tows at least one source, but no streamers. The first set 410 of sources includes a number NF of front sources 412 and the second set 430 of sources includes a number NT of top sources 432. In one embodiment, the number NT is larger than the number NF. In one application, the number NF is one or larger while the number NT is two or larger. In still another application, NF is 2 and NT is 6. In yet another embodiment, NF is 2 and NT is 5. Other values may be possible for NT and NF as long as NT is larger than NF. Note that the term "sources" is used herein in the sense of "array," as explained in relation to FIG. 3 above, and not as a single source element $322_i$.

A cross-line distance between adjacent streamers is DC, a cross-line distance between adjacent top sources is DSTy, and a cross-line distance between adjacent front sources is DSFy. The cross-lines are taken along the cross-line direction Y, which is substantially perpendicular to the inline direction X of vessel course. In one embodiment, the distance DSTy is larger than the distance DSFy. An inline distance between the front sources 412 and the streamer vessel 402 is DFSx and an inline distance between the head 404A of the streamer spread 404 and the top sources is LTC. A length of the streamers is LC. In one application, the length LTC is larger than zero and smaller than LC. In one application, the length LTC is substantially half of the length LC. In one application, the streamer vessel 402 follows a sail line 440 and the source vessel 434 follows a sail line 442. In one embodiment, the two sail lines 440 and 442 are identical. However, in another embodiment, there is a cross-line offset between the two sail lines 440 and 442. In yet another application, the inline position DTSx for each top source relative to the source vessel 434 is the same. FIG. 4 also illustrates the inline distance DSTx between consecutive shootings of a given top source and the inline distance DSFx between consecutive shooting of a given front source. In one application, the distance DSFx is larger than the distance DSTx.

Figure 5:
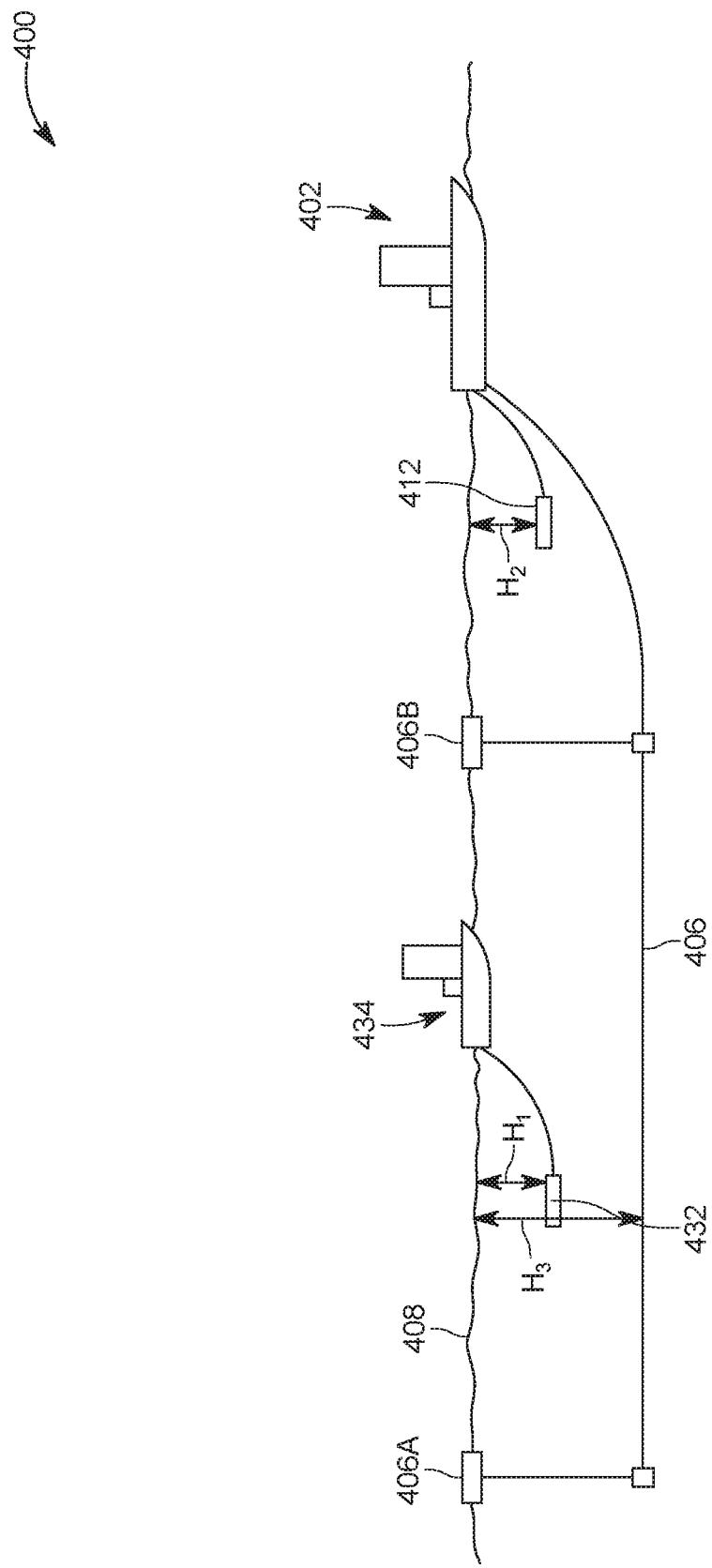
FIG. 5 is a vertical cross-section of the marine seismic data acquisition system of FIG. 4.

A vertical view of the system 400 is shown in FIG. 5, in which the two vessels 402 and 434 are shown floating at the water surface 408. A front source 412 and a top source 432 are visible, while the other front and top sources are not visible as they are behind these two sources. Also visible in the figure is a streamer 406. A depth H1 of the top source relative to the water surface 408 may be equal to a depth H2 of the front source relative to the water surface 408. FIG. 5 shows tail and head buoys 406A, 406B that, together with the steering devices along the streamer, maintain a given depth H3 of the streamer relative to the water surface 408 below the top source 432. Although FIG. 5 shows the streamer to be flat, it is possible to use the steering devices to make the streamer to have a curved shape. In one embodiment, the depths H1 to H3 may take any value. In another embodiment, the depth H3 is larger than the depth H1. However, it is also possible that in another embodiment the depth H3 is smaller than H1, i.e., the top sources are actually bottom sources, as they are located vertically below the streamer spread. In still another embodiment, it is possible that the depths of the various top sources are different from each other.

Figure 6:
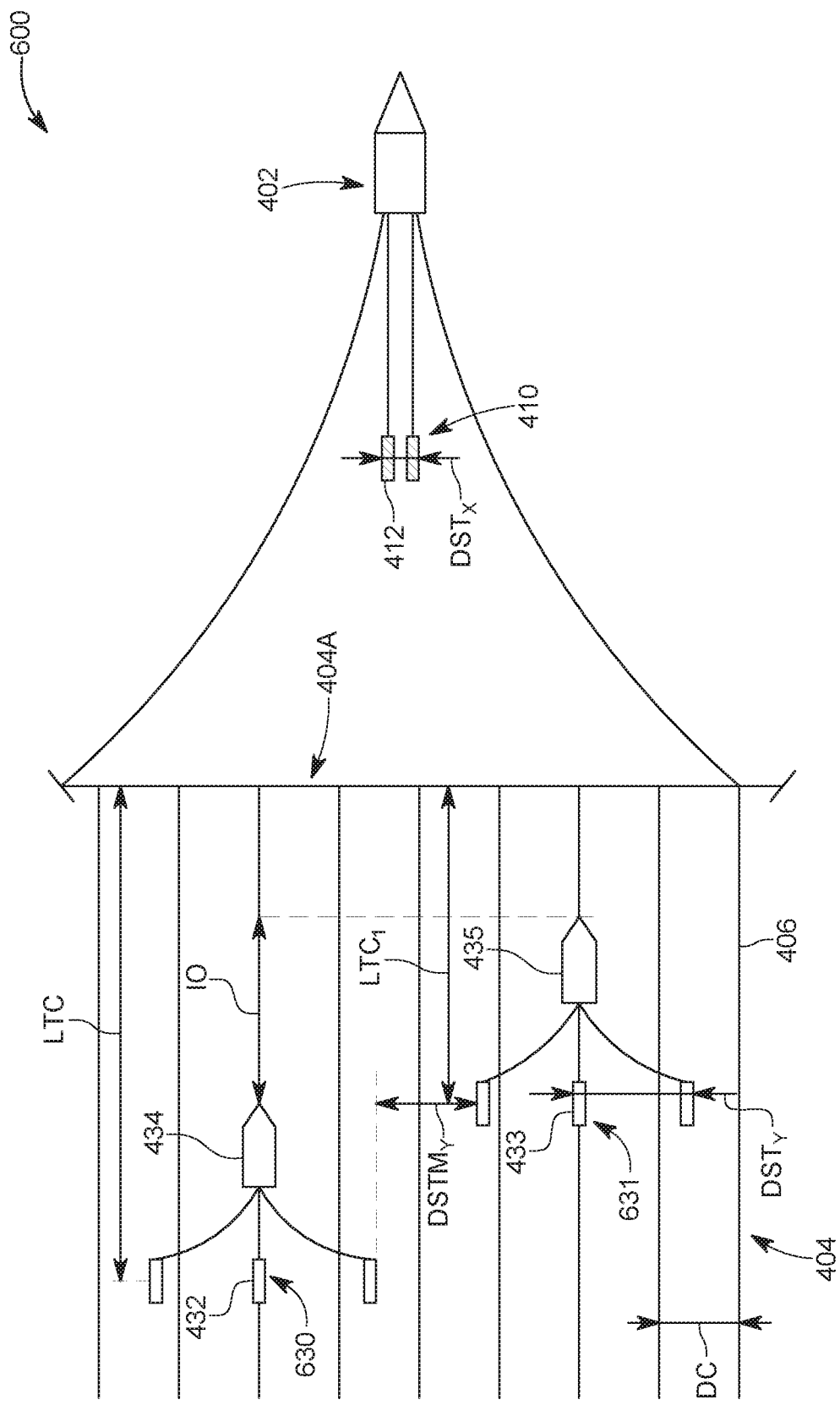
FIG. 6 illustrates another marine seismic data acquisition system that includes front sources and top sources.

The distance DSFy in FIG. 4, between the front sources, is typically between 25 and 50 m, but larger distances are also possible. However, because the distance DSTy between the top sources is larger, e.g., 50 m or higher (preferably 75, 100, 125 or 150 m), there are situations when the cross-line distance between the outer most top sources is more than 300 m. Maintaining the top sources at such a distance is a challenge for the existing vessels. Thus, according to another embodiment, as illustrated in FIG. 6, the set 430 including the number NT of the top sources may be split into two or three or more sub-sets 630 and 631, and each sub-set may be towed with a corresponding source vessel 434 and 435, respectively. The cross-line distance DSTy between adjacent top sources in the same set or different sets is maintained constant. In one application, if two or more top vessels are present, it is possible that the cross-line distance DSTMy between the outermost sources of neighboring top vessels is larger than the cross-line distance DSTy within the spread of each top vessel. However, in this embodiment, the inline distance LTC between the head 404A of the streamer spread 404 and the first set 630 of the top sources 432 is different from the inline distance LTC1 between the head 404A and the second set 631 of the top sources 433. In other words, there is an inline offset 10 between the first and second source vessels 434 and 435. One skilled in the art should understand that more than two source vessels (n source vessels) may be used on top of the streamer spread as long as all the top sources remain located directly above the streamer spread. Any number of top sources may be attached to each of the source vessels.

In one embodiment, the seismic system 600 includes a single streamer vessel 402 and two or more source vessels 434 and 435. For this embodiment, assuming that NT is two or larger, the DSTy is larger than DSFy, and/or the number NT is larger than the number NF. Any combination of the features discussed with regard to FIGS. 4 and 6 may be implemented for a given seismic system. In this embodiment, it is possible to make the offset 10 between two source vessels to be 500 m or more. In this embodiment, the DSTy is the same between any adjacent top sources, even if one top source belongs to the set 630 and the other top source belongs to the set 631. While the DSTy is desired to be larger than the DSFy, in one embodiment, this relationships could be reversed as long as the number NT is larger than the number NF. Each source 432 and/or 433 may include one or more subarrays, and each subarray may include two or more individual source elements, as discussed with regard to FIG. 3. In one application, each source 432 and/or 433 includes three subarrays and each subarray includes between 5 and 10 individual source elements (for example, air guns). The sources 412 may also include three sub-arrays and each subarray may include 5 to 10 individual source elements. With this configuration, the individual source elements are configured (e.g., if air guns, by selecting their air volume and pressure) to emit a first frequency spectrum FF for the front sources and a second frequency spectrum FT for the top sources. The FF may be between 1 and 10 Hz or 0.1 and 10 Hz or 0.1 to 60 Hz and the FT may be larger than 10 Hz. The FT may be 3-300 Hz or 3-200 Hz or 3-100 Hz. In one embodiment, the lowest frequency limit for the FT is 3 Hz.

Figure 7:
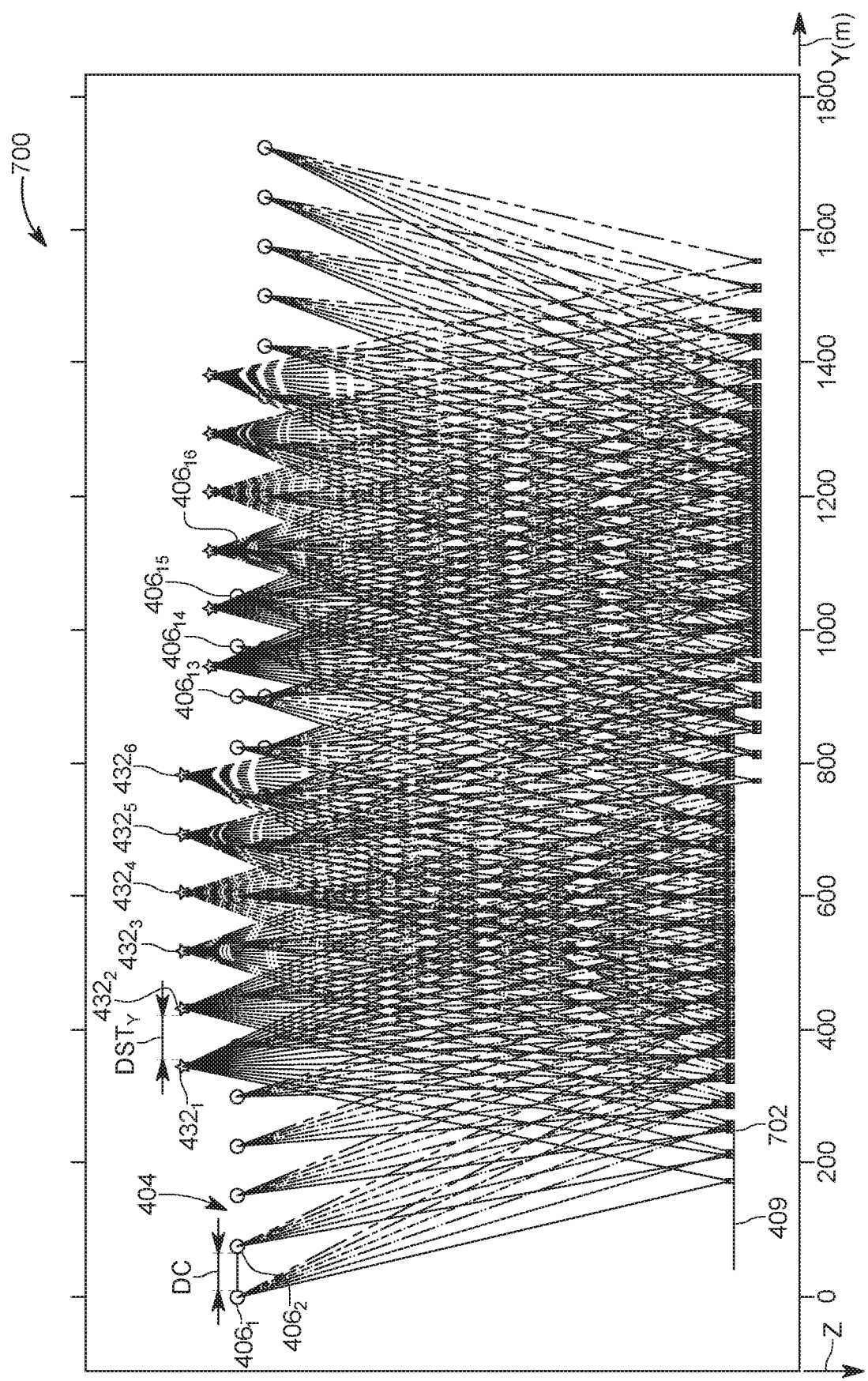
FIG. 7 illustrates the seismic waves and the interleaving Common Midpoint (CMP) pattern generated by the top sources for a given configuration.

Two different implementations of the above discussed systems are now presented. FIG. 7 shows a cross-section (in the plane YZ, where Y is the cross-line and Z is the depth) through a marine seismic data acquisition system 700 that includes two sail lines, each with 6 top sources $432_1$ to $432_6$, separated by a cross-line distance DSTy=87.5 m so that a distance between the most outer sources in adjacent sail lines is 163 m. Two different source vessels tow the 6 top sources, each vessel towing 3 sources. The system 700 has a streamer spread 404 that includes 16 streamers, separated by a distance DC=75 m. The waves emitted by the 6 sources are illustrated in the figure as being reflected from the ocean bottom 409, and then being recorded by the seismic sensors of the plural streamers $406_1$, $406_2$, etc. For this configuration, a bin width 702 is 6.25 m (note that this figure shows the interleaving CMP pattern, where the CMP refers to a location at half the cross-line distance between the source and a receiver), the sail lines are separated by a distance of 600 m.

Figure 8:
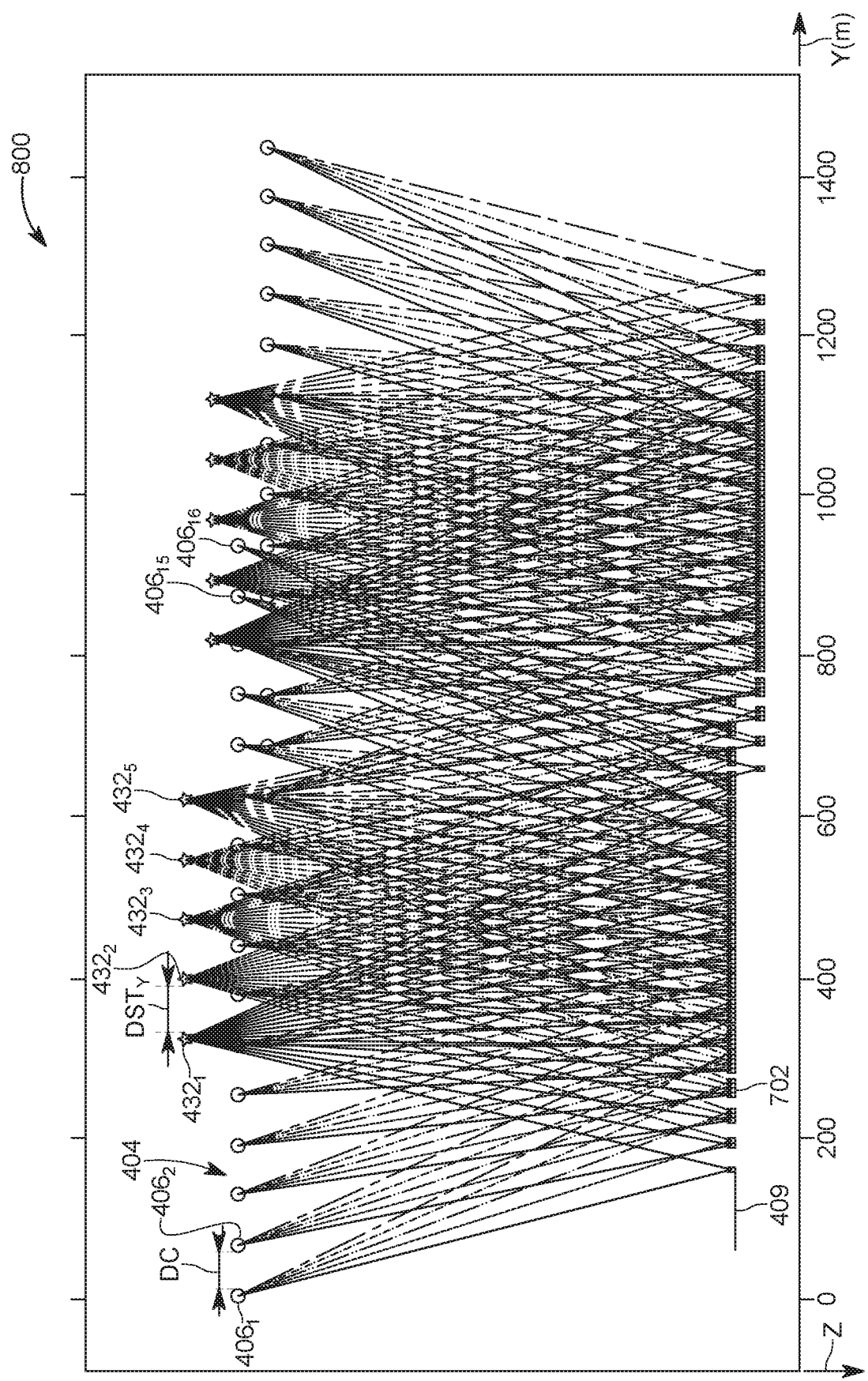
FIG. 8 illustrates the seismic waves and the CMP pattern generated by the top sources for another given configuration.

FIG. 8 shows a cross-section in the plane YZ through a marine seismic data acquisition system 800 that includes two sail lines, each with 5 top sources $432_1$ to $432_5$, separated by a cross-line distance DSTy=75 m so that a distance between the most outer sources is 300 m. A single source vessel tows the 5 top sources. The system 800 has a streamer spread 404 that includes 16 streamers, separated by a distance DC=62.5 m. The waves emitted by the 5 sources are illustrated in the figure as being reflected from the ocean bottom 409, and then as being recorded by the seismic sensors of the plural streamers. For this configuration, a bin width 702 is 6.25 m, the sail lines are separated by a distance of 500 m. In this regard, note that the figure shows the 5 sources moving along a first sail line and then the same 5 sources coming back along an adjacent sail line (the sources to the right in the figure).

Figure 9:
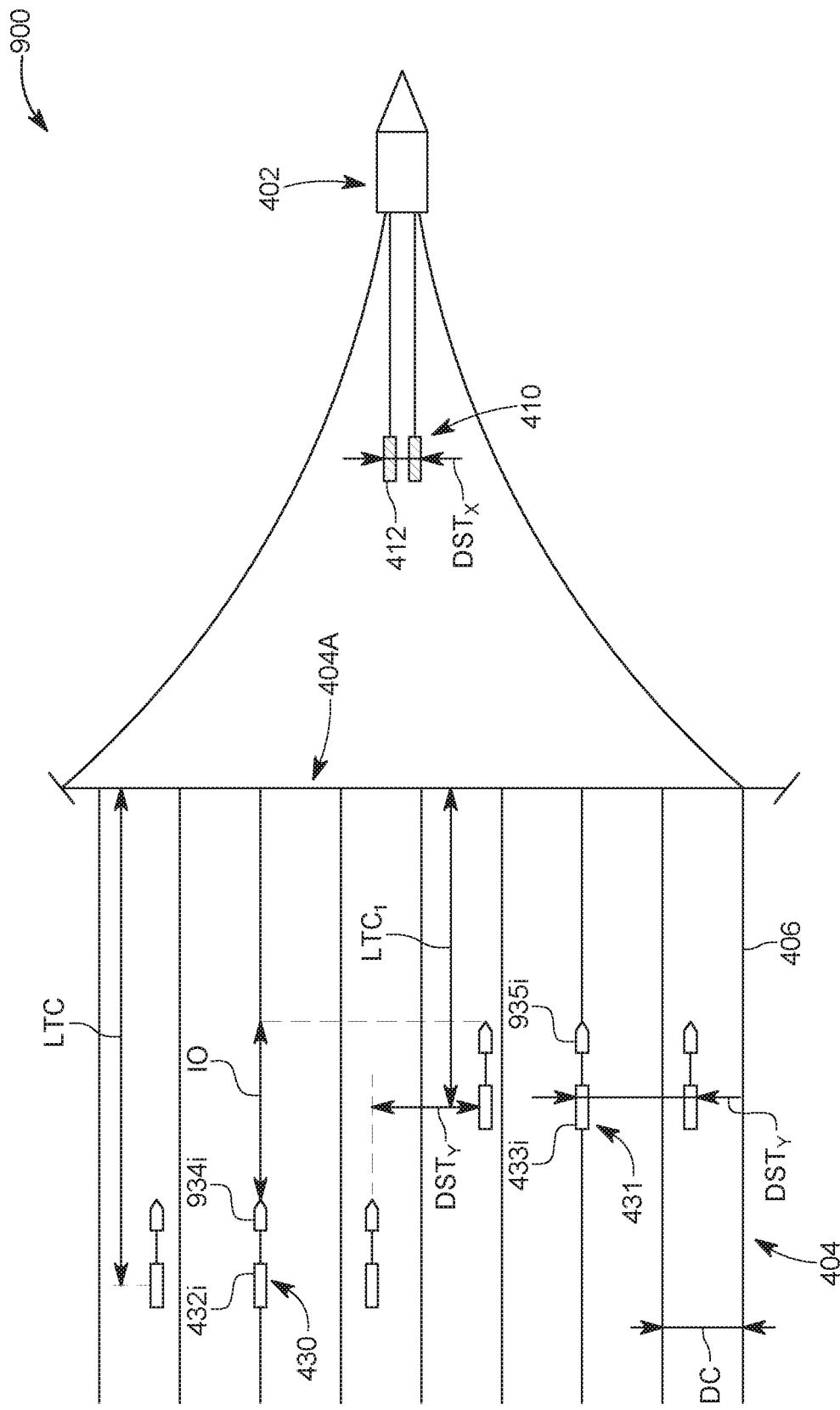
FIG. 9 illustrates still another marine seismic data acquisition system that includes front sources and top sources, where the top sources are towed with autonomous vehicles.

Those skilled in the art will know that the streamer spread is towed at a certain depth relative to the water surface, for example, 20 to 30 m, and thus, the top sources and the source vessel(s) have to stay above this depth, to not interfere with the streamers. For this reason, in one embodiment, the source vessel is selected to be much smaller than the streamer vessel, so that it does not reach in depth for more than 2 m, or 5 m or a maximum of 10 m. The same is true for the top sources, i.e., a distance between the float of each subarray and the individual source elements is made to be less than the depth of the streamer. However, to reduce even more the size of the source vessel, which usually generates its own seismic waves, which are recorded as noise by the streamers, in the embodiment illustrated in FIG. 9, each top source is towed by a corresponding autonomous vessel, which can either float at the surface of the water or floats at a certain depth in the water. In this regard, FIG. 9 shows that each top source $432_i$ and $433_i$ is towed by a corresponding autonomous vehicle $934_i$ and $935_i$, respectively, where "i" is an integer equal to one or more. The autonomous vehicles $934_i$ and $935_i$ may be any type of autonomous vehicle (e.g., remote controlled boat, submarine, drone, etc.) and they may be powered by any means, e.g., gas, electricity, nuclear power, solar power, hydrogen, etc. The cross-line distance DSTy between adjacent top sources can be varied across the streamer spread.

Figure 10:
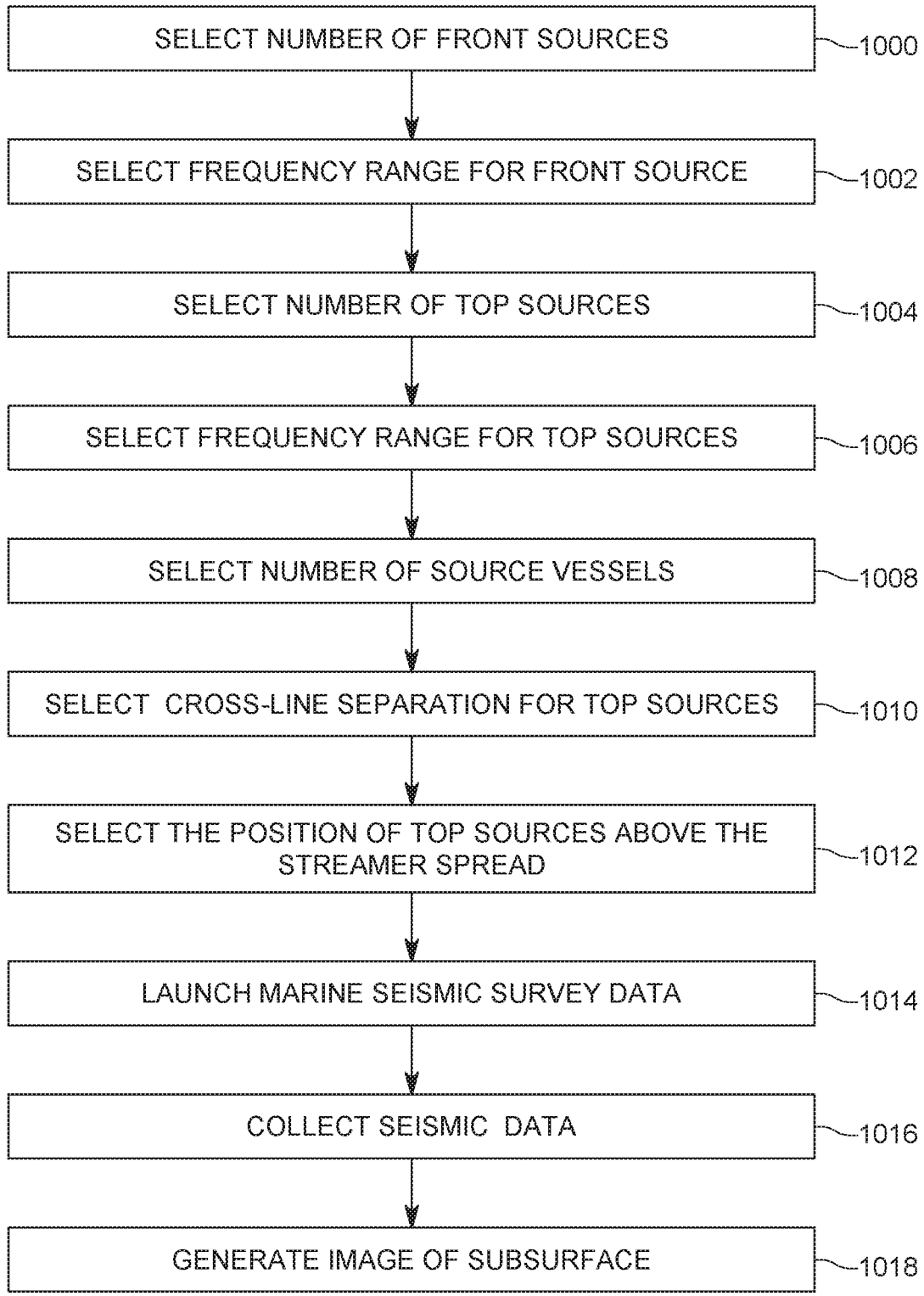
FIG. 10 is a flowchart of a method for configuring a marine seismic data acquisition system.

A method for collecting seismic data using one of the configurations disclosed above is now discussed with regard to FIG. 10. In step 1000, the operator of the seismic survey selects the number NF of the front sources 412. In step 1002, the operator selects the frequency spectrum FF for the front sources. In step 1004, the operator selects the number NT of the top sources 432, 433 and in step 1006 the operator selects the frequency spectrum FT of the top sources. As discussed above, these selections may result in NT being larger than NF, and FT being different from FF, with the possibility that FT and FF have an overlapping region.

In step 1008, the operator selects the number n of source vessels and assigns a corresponding number of top sources to each source vessel. In step 1010, the operator selects the cross-line distance DSTy between adjacent top sources. In one application, the cross-line distance DSTy between the adjacent top sources is larger than the cross-line distance DSFy between the adjacent front sources. In step 1012, the operator selects the position (LTC and LTC1) of the top sources relative to the head of the streamer spread so that all the top sources are positioned vertically above or below the streamer spread. Note that while the above embodiments discuss the concept of placing the top sources directly over the streamer spread, the same results may be obtained if the top sources are placed directly below the streamer spread. In step 1014, a marine seismic data acquisition system having the configuration defined by the previous steps is launched and in step 1016 shallow seismic data, due to the top sources, and deep penetration seismic data, due to the front sources, are collected with such system. In step 1018, the shallow and deep penetration seismic data is combined and processed to generate an image of the subsurface, for determining the locations of the possible oil and gas reservoirs. One skilled in the art would understand that similar results may be achieved with less steps or with the order of steps changed as necessary by the operator of the system. For example, the number of top sources may be selected before selecting the number of front sources.

The disclosed embodiments provide a marine seismic data acquisition system that uses a combination of front and top sources for collecting seismic data having various characteristics, i.e., shallow features and deep features of the subsurface. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine seismic data acquisition system comprising:
a streamer spread including plural streamers;
a first set of front sources configured to generate seismic waves;
a streamer vessel towing the streamer spread and the first set of the front sources, in front of the streamer spread along an inline direction X;
a second set of top sources configured to generate additional seismic waves; and
a first source vessel and a second source vessel towing a first subset of the second set of top sources and a second subset of the second set of top sources, respectively, directly above or below the streamer spread, the first subset being offset cross-line relative to the second subset.

2. The system of claim 1, wherein a cross-line distance DSTy between adjacent top sources along a cross-line direction Y, which is perpendicular to the inline direction X, is larger than a cross-line distance DSFy between adjacent front sources.

3. The system of claim 1, wherein a number of the top sources NT is 6, each of the first and second subset includes 3 top sources, and a number of the front sources NF is 2.

4. The system of claim 1, wherein a cross-line distance DSTy between adjacent top sources along a cross-line direction Y, which is perpendicular to the inline direction X, is larger than a cross-line distance DC between adjacent streamers of the plural streamers.

5. The system of claim 1, wherein a frequency spectrum FF of the first set of the front sources includes seismic waves with frequencies less than 10 Hz, and the FF is different from a frequency spectrum FT of the second set of top sources that does not include seismic waves with frequencies less than 10 Hz.

6. The system of claim 5, wherein the frequency spectrum FF partially or completely overlaps with the frequency spectrum FT.

7. The system of claim 1, wherein the first source vessel is offset along the inline direction from the second source vessel.

8. The system of claim 1, wherein a cross-line distance between adjacent top sources belonging to the first subset is same as a cross-line distance between adjacent sources belonging to the second subset.

9. A marine seismic data acquisition system comprising:
a streamer spread including plural streamers;
a set of front sources configured to generate seismic waves, wherein the set of the front sources is towed in front of the streamer spread, along an inline direction X; and
a first set of top sources towed parallel with an inline offset relative to a second set of top sources, the top sources belonging to the first and second set being towed directly above or below the streamer spread,
wherein a cross-line distance DSTy between adjacent top sources along a cross-line direction Y, which is perpendicular to the inline direction X, is larger than a cross-line distance DSFy between adjacent front sources.

10. The system of claim 9, wherein a number of the top sources NT is 6, each of the first and second set includes 3 top sources, and a number of the front sources NF is 2.

11. The system of claim 9, further comprising:
a first source vessel that tows the first set of top sources; and
a second source vessel that tows the second set of the top sources.

12. The system of claim 9, wherein a frequency spectrum FF of the front sources includes seismic waves with frequencies less than 10 Hz, and the FF is different from a frequency spectrum FT of the top sources that does not include seismic waves with frequencies less than 10 Hz.

13. The system of claim 11, wherein each of the first and second source vessels tows 5 top sources, and a number of front sources NF is 1 or 2.

14. The system of claim 9, further comprising:
a plurality of source vessels, each of the source vessels towing one of the top sources.

15. The system of claim 9, wherein a cross-line distance DSTy between adjacent top sources along a cross-line direction Y, which is perpendicular to the inline direction X, is larger than a cross-line distance DC between adjacent streamers of the plural streamers.

16. The system of claim 9, wherein a frequency spectrum FF of the front sources partially or completely overlaps a frequency spectrum FT of the top sources.

17. A method for configuring a marine seismic acquisition data system, the method comprising:
selecting a number NF of front sources, wherein the front sources are towed in front of a streamer spread, along an inline direction X;
selecting a frequency range FF for the front sources;
selecting a number NT of top sources towed vertically directly above or below the streamer spread by at least two vessels, the top sources being split into at least two subsets of plural source elements, which are offset crossline relative to one another; and
selecting a cross-line separation DSTy between adjacent top sources of the top sources that is larger than a cross-line separation DSFy between adjacent front sources of the front sources, wherein a cross-line direction is perpendicular to an inline direction.

18. The method of claim 17, wherein the number NT is larger than the number NF.

19. The method of claim 17, further comprising:
selecting a frequency range for the top sources to be different from a frequency range for the front sources.

* * * * *